US008473175B2

(12) United States Patent
Holo et al.

(10) Patent No.: US 8,473,175 B2
(45) Date of Patent: Jun. 25, 2013

(54) CONTROLLING MOVEMENT OF A VESSEL TRAVELING THROUGH WATER DURING A SEISMIC SURVEY OPERATION

(75) Inventors: Andreas Thiblin Holo, Hosle (NO); Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 13/465,677

(22) Filed: May 7, 2012

(65) Prior Publication Data

US 2012/0221182 A1 Aug. 30, 2012

Related U.S. Application Data

(62) Division of application No. 11/956,025, filed on Dec. 13, 2007, now Pat. No. 8,175,765.

(51) Int. Cl.
*G06F 17/00* (2006.01)
(52) U.S. Cl.
USPC ................... 701/93; 701/21; 367/16
(58) Field of Classification Search
USPC ...... 701/21, 36, 300–302, 93, 96; 367/15–19, 367/153, 154
See application file for complete search history.

(56) References Cited

U.S. PATENT DOCUMENTS

| 3,193,045 A | 7/1965 | Levin |
| 3,219,968 A | 11/1965 | Loper et al. |
| 3,274,608 A | 9/1966 | Ewing et al. |
| 3,350,683 A | 10/1967 | Sengbush |
| 3,441,901 A | 4/1969 | Cawley et al. |
| 3,560,912 A | 2/1971 | Spink et al. |
| 3,605,674 A | 9/1971 | Weese |
| 3,644,882 A | 2/1972 | Burg |
| 3,774,570 A | 11/1973 | Pearson |
| 3,831,136 A | 8/1974 | Sagoci |
| 3,906,352 A * | 9/1975 | Parker .............................. 367/19 |
| 4,016,531 A | 4/1977 | Cook et al. |
| 4,079,353 A | 3/1978 | Jenkinson |
| 4,404,664 A | 9/1983 | Zachariadis |
| 4,405,036 A | 9/1983 | Wener et al. |
| 5,284,323 A | 2/1994 | Pawkett |
| 5,443,027 A | 8/1995 | Owsley et al. |
| 6,504,792 B2 | 1/2003 | Barker |
| 6,525,992 B1 | 2/2003 | Olivier et al. |

(Continued)

FOREIGN PATENT DOCUMENTS

| EP | 0613025 B1 | 8/1994 |
| GB | 2414804 A | 12/2005 |
| WO | 2004092771 A2 | 10/2004 |
| WO | 2005096018 A1 | 10/2005 |

OTHER PUBLICATIONS

Qin and Badgwell, "An Overview of Industrial Model Predictive Control Technology," 1997, <www.che.utexas.edu/.about.qin/cpcv/cpcv14.html>.

(Continued)

*Primary Examiner* — Richard M. Camby

(57) ABSTRACT

To perform control of movement of a marine vessel traveling through water during a seismic survey operation, input information relating to factors that affect a speed of the marine vessel is received. The speed of the marine vessel is adjusted in response to the received information relating to the factors that affect the speed of the marine vessel.

5 Claims, 4 Drawing Sheets

U.S. PATENT DOCUMENTS

| | | |
|---|---|---|
| 6,590,831 B1 | 7/2003 | Bennett et al. |
| 6,671,223 B2 | 12/2003 | Bittleston |
| 6,681,710 B2 | 1/2004 | Semb |
| 6,775,618 B1 | 8/2004 | Robertsson et al. |
| 6,932,017 B1 | 8/2005 | Hillesund |
| 7,047,898 B2 | 5/2006 | Petersen et al. |
| 7,415,936 B2 | 8/2008 | Storteig et al. |
| 7,804,738 B2 | 9/2010 | Storteig et al. |
| 7,876,642 B2 | 1/2011 | Robertsson et al. |
| 7,881,153 B2 | 2/2011 | Stokkeland et al. |
| 8,175,765 B2 | 5/2012 | Holo et al. |
| 2005/0219948 A1 | 10/2005 | Naess |
| 2007/0064526 A1 | 3/2007 | Holo |
| 2008/0175097 A1 | 7/2008 | Storteig et al. |
| 2009/0141587 A1 | 6/2009 | Welker et al. |

OTHER PUBLICATIONS

Extended Search Report of European Patent Application No. 08170996.6 dated Aug. 25, 2011.

* cited by examiner

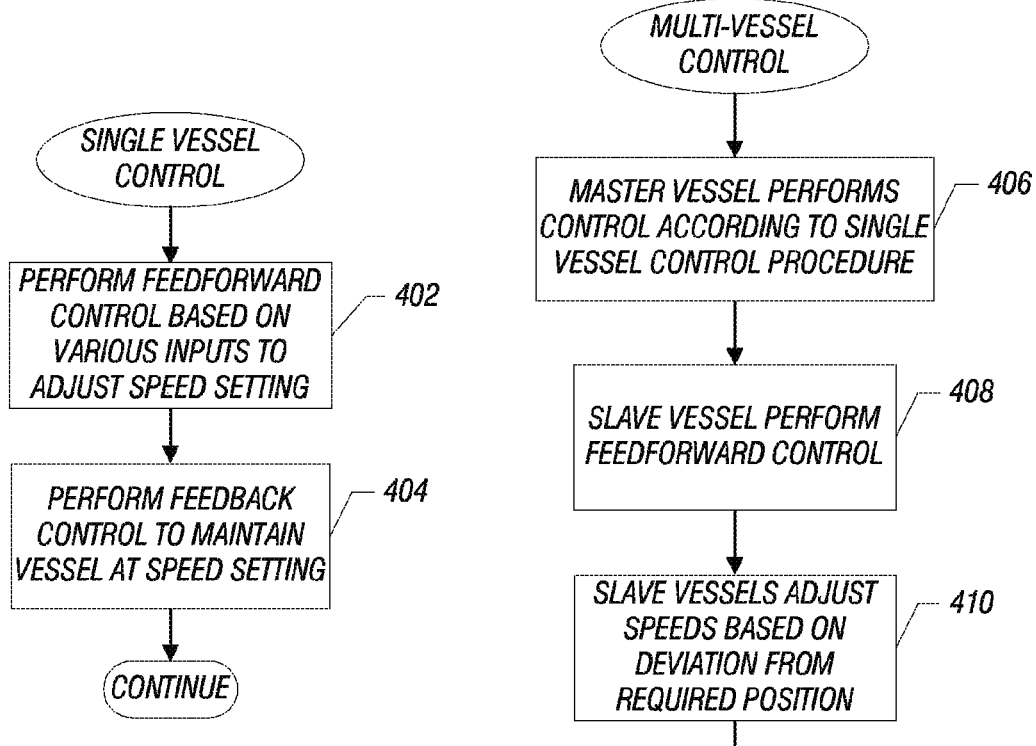

CONTROLLING MOVEMENT OF A VESSEL TRAVELING THROUGH WATER DURING A SEISMIC SURVEY OPERATION

CROSS-REFERENCE TO RELATED APPLICATIONS

This application is a divisional of U.S. patent application Ser. No. 11/956,025 filed Dec. 13, 2007, U.S. Pat. No. 8,175, 765, which is incorporated herein by reference in its entirety.

TECHNICAL FIELD

The invention relates to controlling movement of a vessel traveling through water during a seismic survey operation, which includes adjusting a speed of the vessel.

BACKGROUND

Seismic surveying is used for identifying subterranean elements, such as hydrocarbon reservoirs, fresh water aquifers, gas injection reservoirs, and so forth. In a marine seismic surveying operation, seismic sources and seismic sensors are towed by one or more marine vessels, with the seismic sources and sensors towed through a body of water above a sea floor. The seismic sources are activated to generate seismic waves directed into the subterranean structure. Examples of seismic sources include air guns, vibrators, explosives, or other sources that generate seismic waves.

The seismic waves generated by a seismic source travel into the subterranean structure, with a portion of the seismic waves reflected back to the surface for receipt by seismic receivers (e.g., geophones, hydrophones, etc.). These seismic receivers produce signals that represent detected seismic waves. Signals from seismic receivers are processed to yield information about the content and characteristic of the subterranean structure.

Conventionally, inline positioning of a marine vessel towing a seismic spread (which can include seismic sensors and/or seismic sources) is performed manually by an operator adjusting the throttle on the bridge of the marine vessel. Inline positioning refers to positioning of the marine vessel along the direction of movement of the marine vessel for performing the seismic survey operation. However, performing the inline positioning of a marine vessel manually is typically inaccurate and does not take into account various environment factors, such as the specific vessel, the spread being towed by the vessel, and environment impact of sea waves and wind.

SUMMARY

In general, according to an embodiment, a method of controlling movement of a vessel traveling through water during a seismic survey operation includes receiving information relating to constraints representing plural aspects of a system for performing the seismic survey operation. A speed of the vessel is adjusted in response to received information relating to constraints representing plural aspects of a system for performing the seismic survey operation.

Other or alternative features will become apparent from the following description, from the drawings, and from the claims.

BRIEF DESCRIPTION OF THE DRAWINGS

FIG. 4 is a flow diagram of an automated process of controlling movement of a marine vessel, according to an embodiment.

FIG. 5 is a flow diagram of an automated process of controlling movement of multiple marine vessels, according to an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
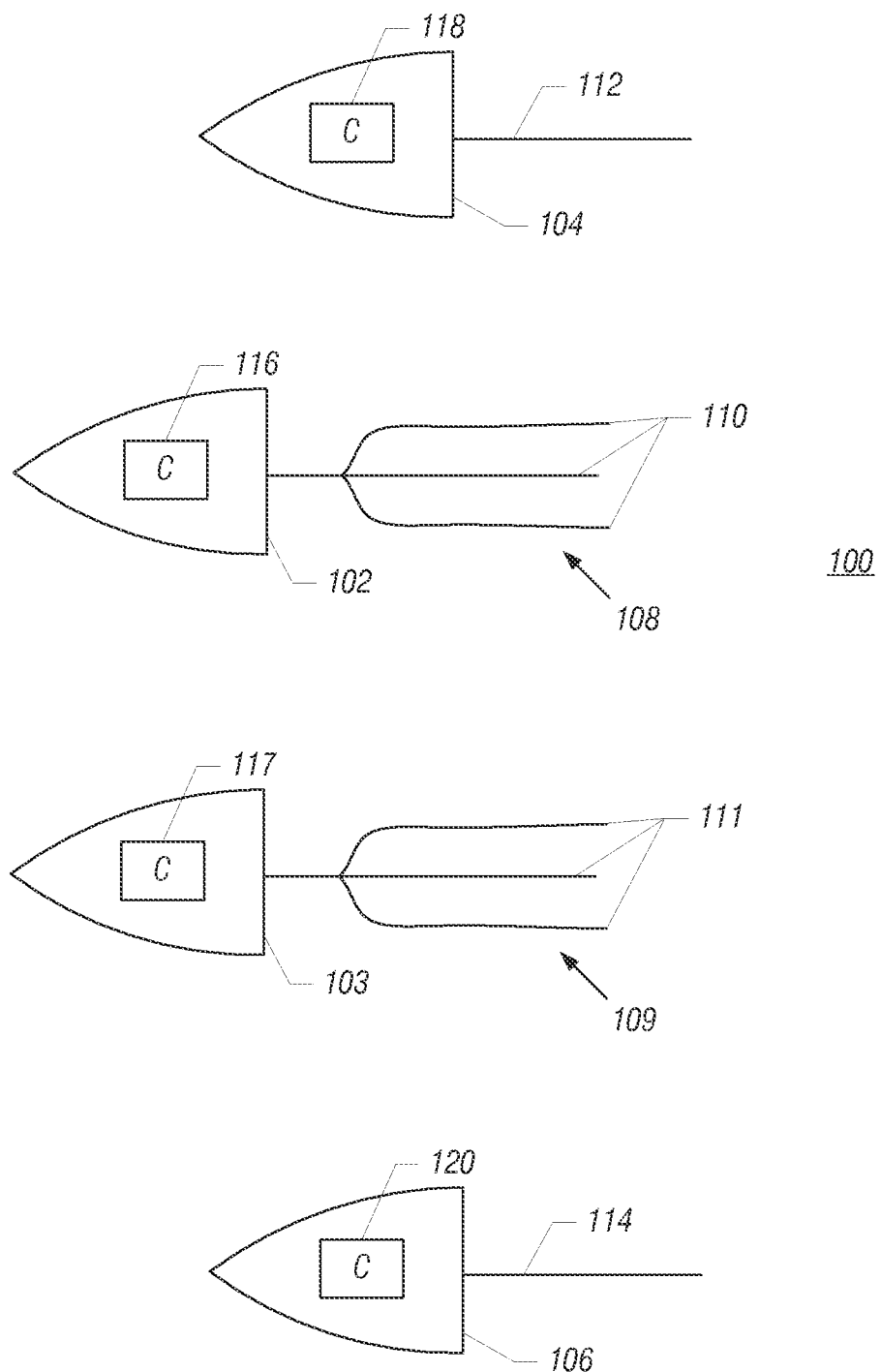
FIG. 1 illustrates an example arrangement that includes multiple vessels towing respective seismic spreads.

FIG. 1 illustrates an example arrangement for performing a marine seismic survey operation, where the example arrangement includes four marine vessels 102, 103, 104, and 106 that move through a body of water 100. The marine vessel 102 can tow a seismic spread 108 that includes streamers 110, where each streamer 110 carries multiple seismic sensors. Similarly, the marine vessel 103 can tow a seismic spread 109 that includes streamers 111, where each streamer 111 carries multiple seismic sensors. Each of the marine vessels 104 and 106 tows a respective string 112 and 114, respectively, of seismic sources, which can be air guns, explosives, vibrators, or other acoustic sources.

During the seismic survey operation, the seismic sources are activated to generate seismic signals that are directed through the sea water into a subterranean structure under a sea floor (not shown). Reflectors (e.g., hydrocarbon reservoirs, water aquifers, gas injection reservoirs, etc.) in the subterranean structure reflect portions of the seismic signals, with the reflected seismic signals being received by the seismic sensors on the streamers 110. From the information detected by the seismic sensors, the subterranean structure can be characterized.

As further depicted in FIG. 1, each of the marine vessels 102, 103, 104, and 106 includes a respective computer 116, 117, 118, and 120. In accordance with some embodiments, the computers 116, 117, 118, and 120 are used to perform automated control of inline movement of the marine vessels through the water 100. In a different embodiment, instead of controlling inline movement of multiple vessels, techniques according to some embodiments can be used to perform control of inline movement of just a single vessel. "Inline movement" refers to the movement of a vessel along a direction in which seismic surveying is to be performed.

The activation of the seismic sources is according to a predefined track along the sea floor. If environment factors should affect the position of the marine vessel with respect to desired positions of the marine vessel over the sea floor, the vessel speed should be adjusted. Also, it is desired that the surveying be performed as quickly as possible (with the marine vessel traveling at higher speeds), to enhance seismic processing speed. In accordance with some embodiments, automated control of movement of vessel takes into account information relating to various constraints representing plural aspects of a system that performs the seismic surveying operation. The various aspects of the system can include, as examples, the following: (1) tension of streamers, such as streamers 110, and 111 towed by a marine vessel; (2) warmup time for seismic sources, such as the seismic sources carried on strings 112 and 114; (3) the stability of deflecting structures, such as monowings on streamers for spreading streamers apart; and (4) minimum time between shots (activations of seismic sources) to satisfy data processing time needed between activations of seismic sources and to avoid overlap of data recordings across multiple activations. The various constraints noted above are constraints on the speed of a vessel.

In addition, the automated control of the movement of a marine vessel can also take into account the present speed of the vessel, as well as inline sea currents, winds, waves, and so forth. The constraints and some of the other inputs listed above are examples of factors that affect the speed of the marine vessel.

In some embodiments, input information relating to the factors that affect the speed of a marine vessel are fed into one or more feedforward controllers implemented by a computer (116, 117, 118, and/or 120), for example. The feedforward control based on the various factors is used by the feedforward controller(s) to adjust a speed setting of the vessel. The speed setting adjustment is performed such that the vessel will be at a correct position when a discrete seismic event is to occur, where the seismic event can be activation of a seismic source or recording of a reflected signal due to activation of the seismic source. The position of the vessel refers to the inline position of the vessel defined in the x-y plane that is generally parallel to the sea floor. For example, it may be desirable to perform a shot (activation of a seismic source) every 25 meters. To accomplish this, the speed setting of the vessel is adjusted, taking into account the various speed factors, such that the vessel is properly positioned when a shot occurs.

In addition to the feedforward control based on the various factors above to adjust the speed setting, feedback control can also be performed by the computer (116, 117, 118, 120) to maintain the speed of the vessel at the speed setting. The speed of a vessel can be measured using any one or more of the following: GPS (global positioning system) receivers, vessel relative water flow measurement devices, and so forth. By combining the feedback control with the feedforward control, inline deviation of a vessel from a predefined plan or track for performing a seismic operation can be minimized or reduced. By using the feedforward control based on the various input information noted above, the speed setting of a vessel can be optimized, where the speed setting is set as high as possible, while not violating the constraints, to enhance the speed at which a marine seismic survey can be performed.

The above describes automated control of vessel speed for a single vessel. Techniques according to some embodiments can also be applied to a multi-vessel arrangement, in which it is desirable to maintain the same speed for all vessels in the arrangement. The master vessel (such as the vessel 102 and/or 103 towing the streamers 110 and/or 111) maintains a particular speed (subject to the changes in speed setting as discussed above), while the other vessels 104, 106 (referred to as "slave vessels") try to position themselves inline with respect to the master vessel. The slave vessels (e.g., 104, 106) can adjust their speed based on movement of the master vessel (as discussed in further detail below), as well as based on a position of each slave vessel along a predefined track.

Figure 2:
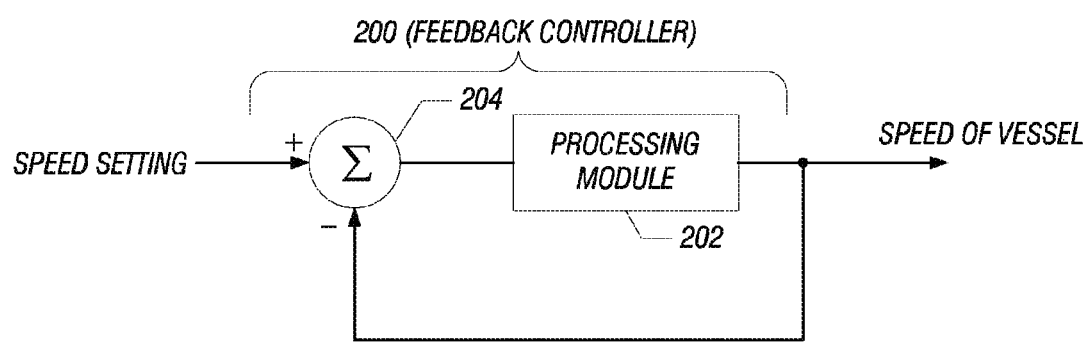
FIG. 2 is block diagram of a feedback controller for adjusting speed of a marine vessel, according to an embodiment.

FIG. 2 shows an example feedback controller 200 that can be implemented by a computer, for example. In one example embodiment, the feedback controller is a PID (proportional-integral-derivative) controller. Alternatively, the feedback controller can be a P (proportional) controller, or a PI (proportional-integral) controller. The P, PI or PID processing is performed by a processing module 202. In yet another alternative, the feedback controller can be a Kalman filter with multivariable control or model predictive control. The input to the processing module 202 is an output of a summer 204, which has a positive input to receive the speed setting of the vessel, and a negative input to receive the output (speed of vessel) of the processing module 202. By using the feedback controller 200 according to an embodiment, the speed of the vessel can be maintained to keep the vessel at the given speed setting.

The speed setting can be speed over ground (SOG) and/or speed through water (STW). Following a reasonable SOG setting will ensure that the constraint relating to warmup time for the seismic sources and the minimum time between activations of seismic sources are satisfied. Using an STW setting will allow constraints relating to the tension of the streamers and the stability of deflecting structures (e.g., monowings on streamers) to be satisfied.

Figure 3:
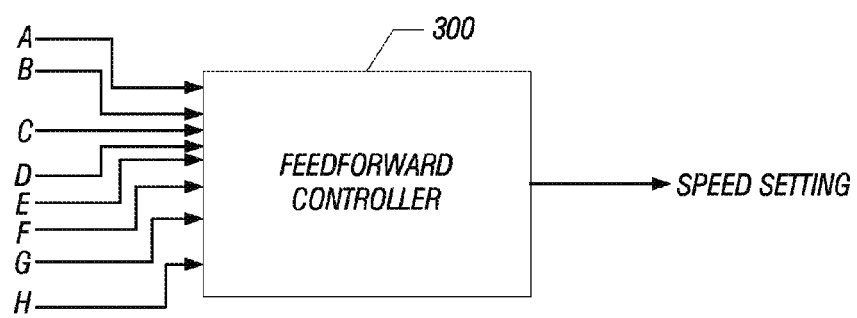
FIG. 3 is a block diagram of a feedforward controller for adjusting a speed setting based on various input information, according to an embodiment.

The speed setting that is provided as an input to the feedback controller 200 of FIG. 2 can be set (adjusted) by a feedforward controller 300, as depicted in FIG. 3. The feedforward controller 300 can be a multivariable feedforward controller that can receive as input multiple variables (A, B, C, D, E, F, G, H in the illustrated example) to provide an optimal speed setting at its output. Examples of multivariable feedforward controllers that can be used include Kalman filters, neural networks, and so forth. Alternatively, instead of using a multivariable feedforward controller, multiple single-loop feedforward controllers, each for receiving a respective one of the inputs A-H, can be used, for adjusting the speed setting of the vessel.

The inputs A-H to the feedforward controller 300 can be as follows:
A: information relating to tension of the streamers;
B: information relating to warmup time for the seismic sources;
C: information relating to stability of deflecting structures on the streamers;
D: minimum time between activations of seismic sources;
E: actual vessel speed;
F: inline current of the water;
G: wind speed; and
H: one or more other vessels (such that relative positions of master and slave vessels can be maintained, for example).

Note that other or alternative input information can be fed into the feedforward controller 300 for adjusting the speed setting.

In an alternative embodiment, instead of using feedback and feedforward controllers as discussed above, a different control structure, such as a model predictive control structure, can be used. Such a different control structure can have the constraints integrally with the control algorithm performed by the control structure.

FIG. 4 shows a general flow diagram of a procedure for performing single-vessel control using some embodiments of the invention. Automated control is provided, such as automated control using a computer. The procedure involves performing (at 402) feedforward control based on various inputs (at discussed above) to adjust the speed setting of the vessel. Also, the procedure involves performing (at 404) feedback control to maintain the vessel at the speed setting adjusted by the feedforward control.

FIG. 5 shows a multi-vessel control procedure for performing control of movement of multiple vessels. In one embodiment, one of the vessels, such as the vessel towing the streamers, is identified as the master vessel. Note that there can be plural master vessels (such as two master vessels 102 and 103 in FIG. 1). Thus, reference to "master vessel" below is intended to cover a multi-master vessel scenario. The master vessel, using its computer, performs (at 406) control of the speed of the master vessel according to the single-vessel control procedure of FIG. 4. The remaining vessels are slave vessels.

The slave vessels perform (at 408) feedforward control based on the actual speed of the master vessel for adjusting the speed setting of the slave vessels. In other words, if the computer on a slave vessel detects that the slave vessel is moving at a speed setting that is slower or faster than the actual speed of the master vessel, then the slave vessel would adjust its speed setting accordingly. Alternatively, the slave vessel can adjust its speed based on relative position to the master vessel.

Moreover, the slave vessels adjust (at 410) their speeds using feedback control based on deviation from required inline positions of the corresponding slave vessels.

Note that if a limit violation (such as violation of one of the constraints discussed above) should happen on one or more of the slave vessels, the master vessel is informed of this limit violation, such that the master vessel can perform an adjustment of its limits and therefore the speed setting of the master vessel accordingly. The communication of the limit violation can be performed manually or automatically.

In a more advanced embodiment, all vessels can have feedforward controllers from constraints on the other vessels as well as constraints of the particular vessel, so that speed setting adjustments are performed simultaneously and automatically on all vessels. In this manner, a single software package can be executed on each of the vessels to perform independent control of the vessels. In yet another embodiment, a single computer on one vessel can be used to control all vessels of a multi-vessel arrangement.

Optionally, information relating to tension of a streamer (110 or 111) can be monitored by a control system according to an embodiment. Note that information relating to tension of a streamer is one input to a feedforward controller as discussed above. Information relating to the tension can be monitored to automatically warn the crew of a vessel of a potentially dangerous situation, where tension on a streamer exceeds some predefined threshold. Not only can the speed of a vessel be adjusted based on tension of a streamer, as discussed above, an alarm can also be automatically generated to warn the crew of a potential problem such that the crew can intervene if the crew deems it necessary.

In some implementations, one or more of the vessels can also be provided with cross-line controllers to maintain cross-line positions of the vessels with respect to each other. The cross-line direction is perpendicular to the inline direction of a vessel, which is the direction in which a vessel is traveling. The cross-line controller can take as input information relating to the inline speed control. In some implementations, the inline controller and cross-line controller may be combined together such that constraints on one will be constraints on the other.

Information regarding the speed of the vessel can also be provided to a control system that controls activation of seismic sources, such as air guns, vibrators, and so forth. The speed information can be used by the control system to control or predict the appropriate activation times for the seismic sources.

Figure 6:
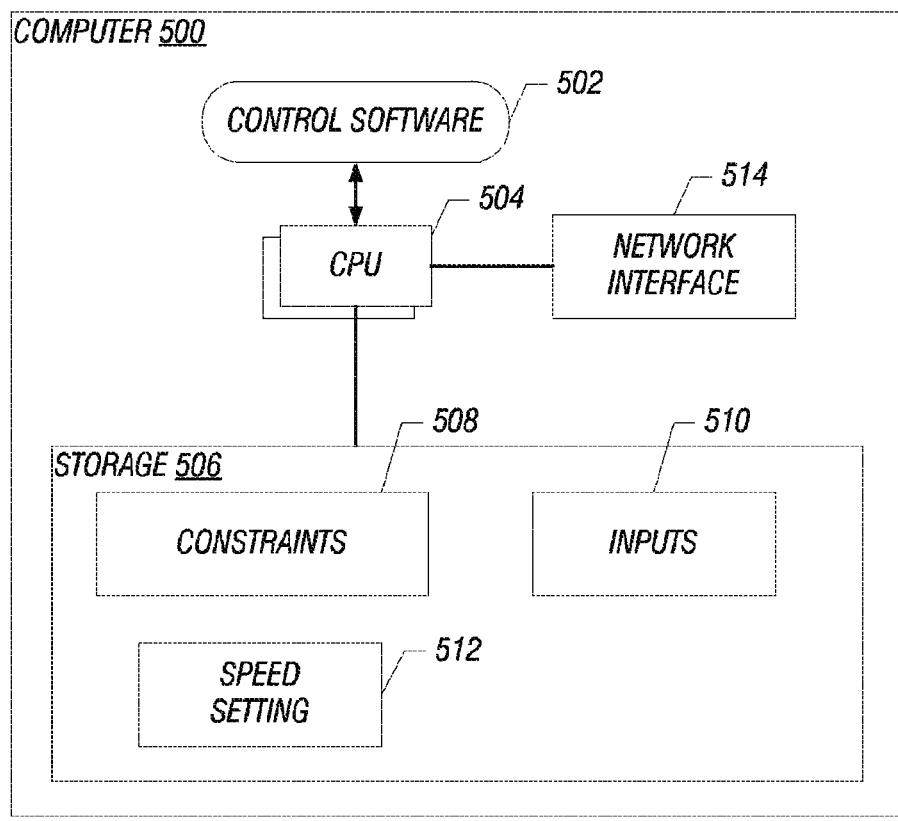
FIG. 6 is a block diagram of a computer in which control software is executable to control movement of a marine vessel, according to an embodiment.

FIG. 6 shows an example computer in which control software 502 according to some embodiments is executable. The control software can be executed on one or more central processing units (CPUs) 504. The CPU(s) 504 is (are) connected to a storage 506, where the storage 506 is used to store information relating to constraints 508, information regarding inputs to the feedforward controller discussed above, and a speed setting 512 of the corresponding vessel.

The computer 500 also includes a network interface 514 to allow the computer 500 to communicate with remote elements, such as a sensor that indicates an inline current in the water, a sensor that detects the actual speed of the vessel, sensors indicating tension on streamers, and other devices for indicating information regarding other aspects of the seismic system that may provide constraints on or otherwise affect the speed of the vessel. The network interface 514 can also be used to communicate commands to the corresponding vessel to control the speed and speed setting of the vessel.

In addition to the various uses discussed above, other uses are also possible for either the single-vessel context or multi-vessel context. For example, according to at least some of the constraints and input variables discussed above, the turn time of a vessel (or vessels) can be minimized or reduced. A vessel can turn from a direction along a first line to another direction along a second line. Minimizing or reducing turn time refers to minimizing or reducing the amount of time from the end of the first line to the start of the second line.

Also, the techniques discussed above (for either the single-vessel or multi-vessel context) can also be applied to plan for a vessel (or vessels) to be at the start of a line or at some distance from the start of the line at a given time. This can be useful when there is timesharing between or among vessels in a given region and if other constraints apply that restricts the actual shooting time. Yet another possible use is for a user to set a target speed over ground, which typically happens when a vessel passes over a particular region, and the vessel has to reduce speed for some amount of time. In a multi-vessel context, other vessels would have to reduce speed accordingly.

Instructions of the control software 502 are loaded for execution on a processor (such as the one or more CPUs 504). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A system comprising:
multiple marine vessels, wherein each of the marine vessels includes a controller for automatically adjusting a speed of the corresponding marine vessel, wherein the speed of each of the marine vessels is automatically adjusted according to factors that affect the speed of the marine vessel, and wherein the controller of a first of the marine vessels is to further adjust the speed of the first marine vessel based on the speed of at least a second of the marine vessels.

2. The system of claim 1, wherein the factors that affect the speed of each marine vessel comprise at least two of:
(1) information relating to tension of at least one streamer towed by the marine vessel;
(2) information relating to warmup time for seismic sources;
(3) information relating to stability of deflecting structures of at least one streamer;
(4) information relating to minimum time between activations of seismic sources;
(5) inline water current information; and
(6) wind speed information.

3. The system of claim 1, wherein the controller of at least one of the marine vessels comprises a feedforward controller to adjust a speed setting of the at least one marine vessel according to the factors.

4. The system of claim 3, wherein the controller of the at least one marine vessel further comprises a feedback controller to maintain the speed of the marine vessel according to the speed setting of the marine vessel.

5. The system of claim 1, wherein the controller of the first marine vessel is to adjust the speed of the first marine vessel based on the speed of at least the second marine vessel by adjusting a speed setting of the first marine vessel, wherein the speed setting specifies a target speed of the first marine vessel.

* * * * *